(12) United States Patent
Holveck et al.

(10) Patent No.: US 11,967,827 B2
(45) Date of Patent: Apr. 23, 2024

(54) SPLIT BUS INVERTER ARCHITECTURE

(71) Applicant: Lunar Energy, Inc., Mountain View, CA (US)

(72) Inventors: Mark Holveck, Sunnyvale, CA (US); Anthony Sagneri, Dayton, NV (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 18/132,282

(22) Filed: Apr. 7, 2023

(65) Prior Publication Data

US 2023/0396072 A1   Dec. 7, 2023

Related U.S. Application Data

(63) Continuation of application No. 17/965,649, filed on Oct. 13, 2022, now Pat. No. 11,671,031.

(60) Provisional application No. 63/314,975, filed on Feb. 28, 2022.

(51) Int. Cl.
| | | |
|---|---|---|
| *H02M 7/487* | (2007.01) |
| *H02J 3/38* | (2006.01) |
| *H02J 3/46* | (2006.01) |
| *H02M 3/00* | (2006.01) |
| *H02M 7/483* | (2007.01) |
| *H02S 30/10* | (2014.01) |

(52) U.S. Cl.
CPC ............ *H02J 3/46* (2013.01); *H02J 3/381* (2013.01); *H02M 3/003* (2021.05); *H02M 7/487* (2013.01); *H02S 30/10* (2014.12); *H02J 2300/24* (2020.01); *H02M 7/483* (2013.01)

(58) Field of Classification Search
CPC ........ H02M 7/48; H02M 7/483; H02M 7/833; H02M 7/487; H02M 7/49
See application file for complete search history.

(56) References Cited

U.S. PATENT DOCUMENTS

| | | | | |
|---|---|---|---|---|
| 10,523,130 B2* | 12/2019 | Bax | ..................... | H02M 7/487 |
| 2004/0124805 A1 | 7/2004 | Edwards | | |
| 2006/0192522 A1* | 8/2006 | Kerkman | ................ | H02M 7/48 |
| | | | | 318/812 |
| 2008/0298103 A1 | 12/2008 | Bendre | | |
| 2014/0307489 A1* | 10/2014 | Kidera | .................. | H02M 7/493 |
| | | | | 363/40 |
| 2016/0082844 A1* | 3/2016 | King | ..................... | H02M 3/158 |
| | | | | 307/10.1 |
| 2016/0254783 A1* | 9/2016 | Unru | ...................... | H02S 50/00 |
| | | | | 324/658 |
| 2016/0322825 A1 | 11/2016 | Urry | | |
| 2020/0185960 A1* | 6/2020 | Toyoda | ................. | H02M 7/487 |
| 2020/0389099 A1 | 12/2020 | Sagasta | | |
| 2021/0367447 A1 | 11/2021 | Narla | | |

OTHER PUBLICATIONS

Wang et al. Low Cost Fuel Cell Converter System for Residential Power Generation. IEEE Transactions on Power Electronics, vol. 19, No. 5, Sep. 2004.

* cited by examiner

*Primary Examiner* — Gary A Nash
(74) *Attorney, Agent, or Firm* — Van Pelt, Yi & James LLP

(57) ABSTRACT

A split DC (Direct Current) bus inverter architecture includes a positive DC bus, a negative DC bus, and a neutral node. It further includes a split phase output. A first output of a DC-DC converter is connected to the neutral node and a second output of the DC-DC converter is connected to one of the positive DC bus or the negative DC bus.

10 Claims, 12 Drawing Sheets

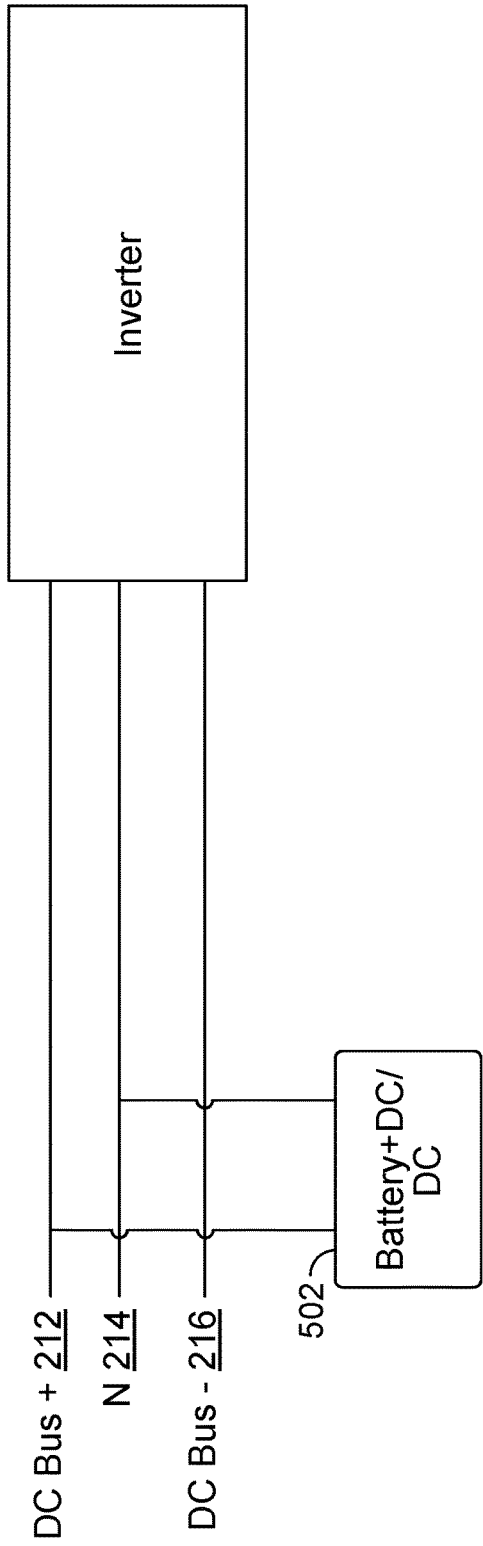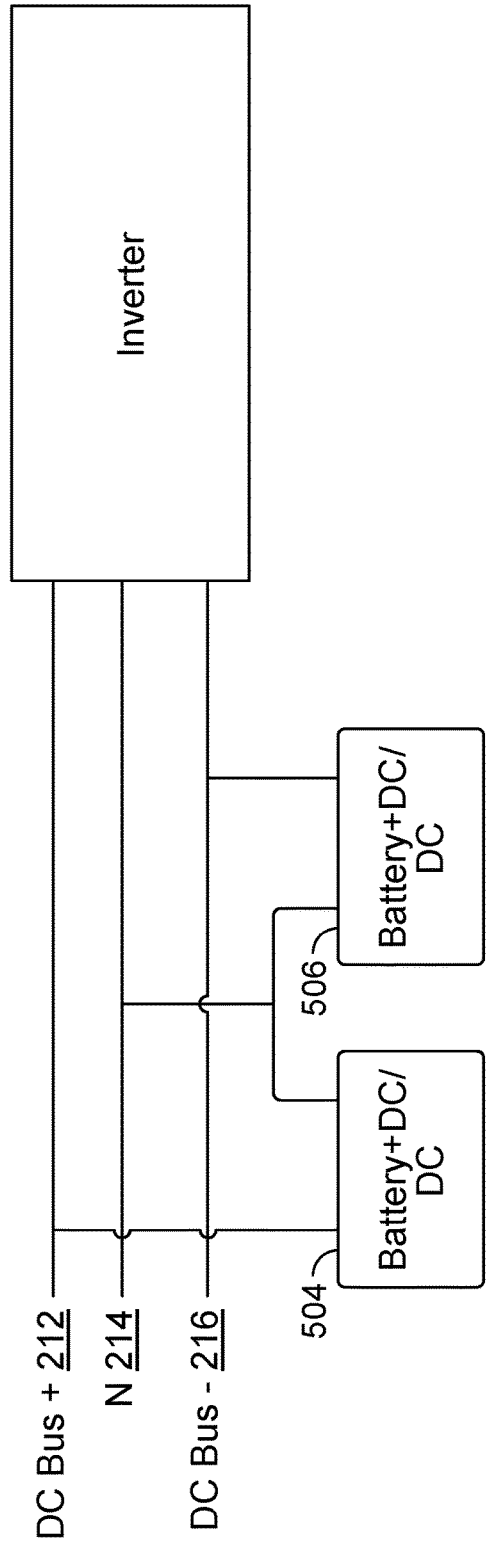
FIG. 5A
FIG. 5B

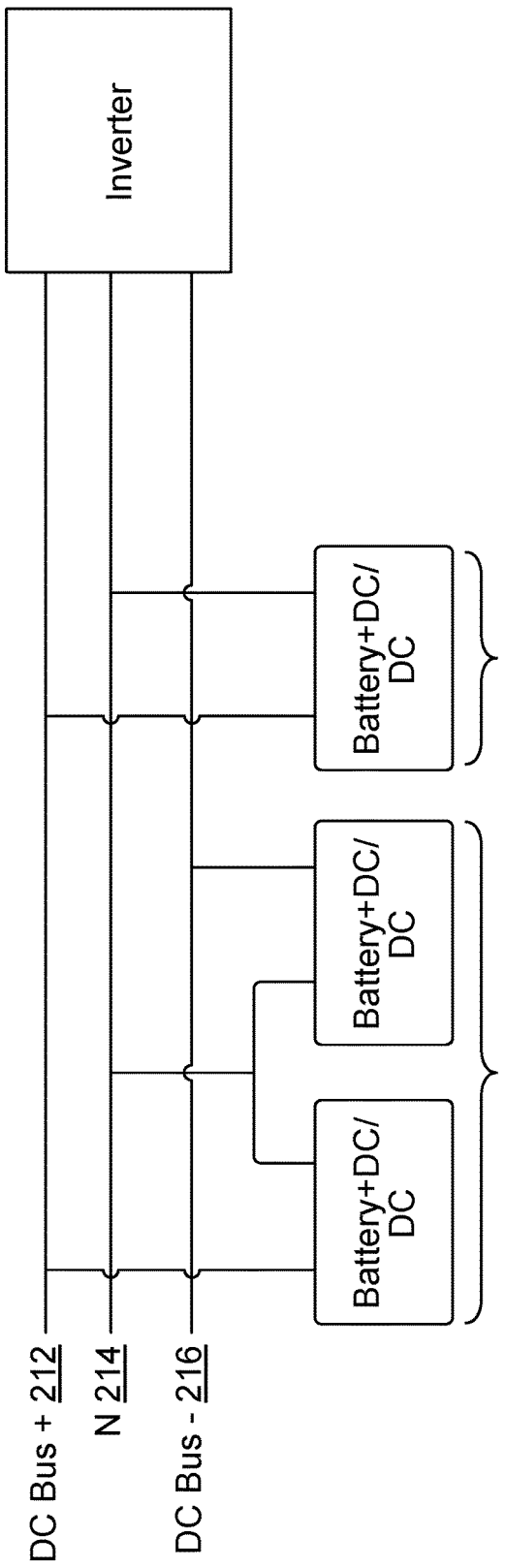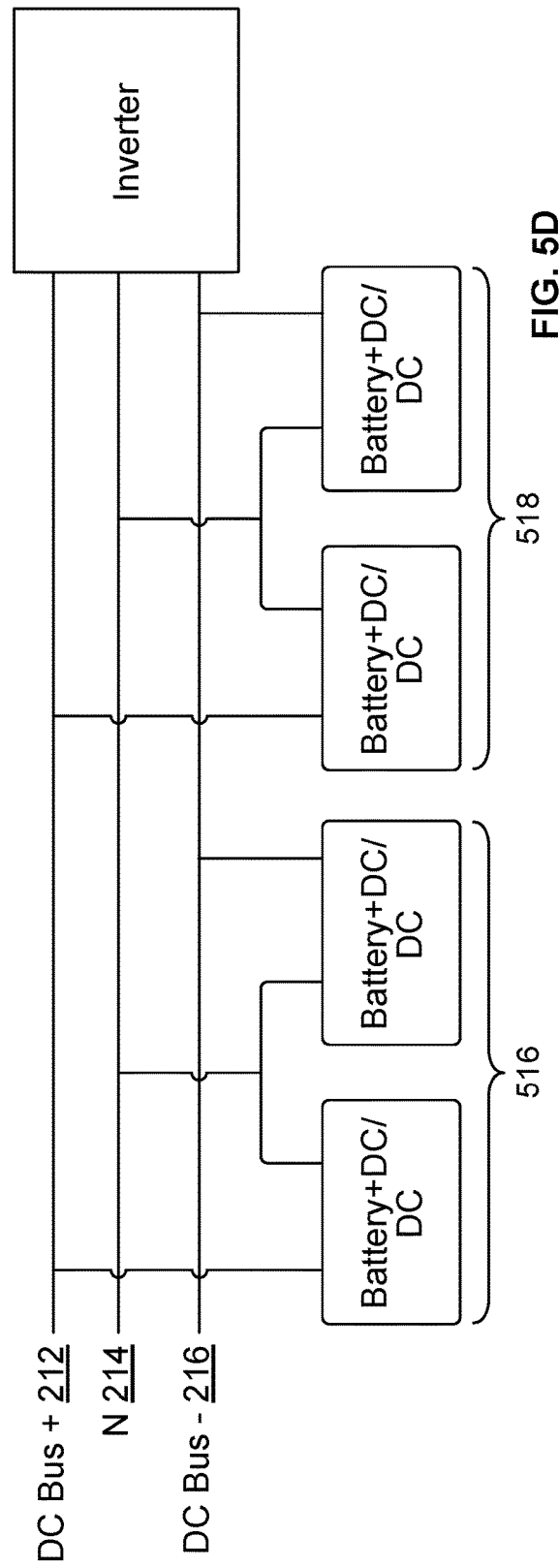
FIG. 5C
FIG. 5D ations.
SPLIT BUS INVERTER ARCHITECTURE

CROSS REFERENCE TO OTHER APPLICATIONS

This application is a continuation of U.S. patent application Ser. No. 17/965,649, entitled SPLIT BUS INVERTER ARCHITECTURE filed Oct. 13, 2022 which is incorporated herein by reference for all purposes, which claims priority to U.S. Provisional Application No. 63/314,975, entitled RAPID SHUTDOWN filed Feb. 28, 2022 which is incorporated herein by reference for all purposes.

BACKGROUND OF THE INVENTION

Electrical power systems such as those including photovoltaic (PV) arrays and energy storage devices (e.g., batteries) are becoming increasingly common in residential and commercial sites. It would be beneficial if the performance of such systems could be increased.

BRIEF DESCRIPTION OF THE DRAWINGS

Various embodiments of the invention are disclosed in the following detailed description and the accompanying drawings.

FIG. 5A illustrates an embodiment of connecting a single battery block coupled with a DC-DC converter to a split DC bus.

FIG. 5B illustrates an embodiment of connecting a group of two battery blocks coupled with DC-DC converters to a split DC bus.

FIG. 5C illustrates an embodiment of connecting three battery blocks coupled with DC-DC converters to a split DC bus.

FIG. 5D illustrates an embodiment of connecting four battery blocks coupled with DC-DC converters to a split DC bus.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of a split DC bus architecture. The split DC bus architecture described herein is used, for example, in an electrical power system that includes, for example, an inverter, a photovoltaic (PV) solar power source, as well as energy storage.

In such electrical power systems, the energy storage system (e.g., battery storage) and PV panels, which are DC sources of power (and in the case of battery storage systems, also receivers of DC power), are connected to a DC side of an inverter. The inverter is then configured to take that DC power (from the energy storage and/or PV panels) as input, and provide as output AC (alternating current) power. For example, the inverter is configured to take input DC power and generate a 60 Hz AC power sine wave for delivery to loads in a site such as a home.

Figure 1:
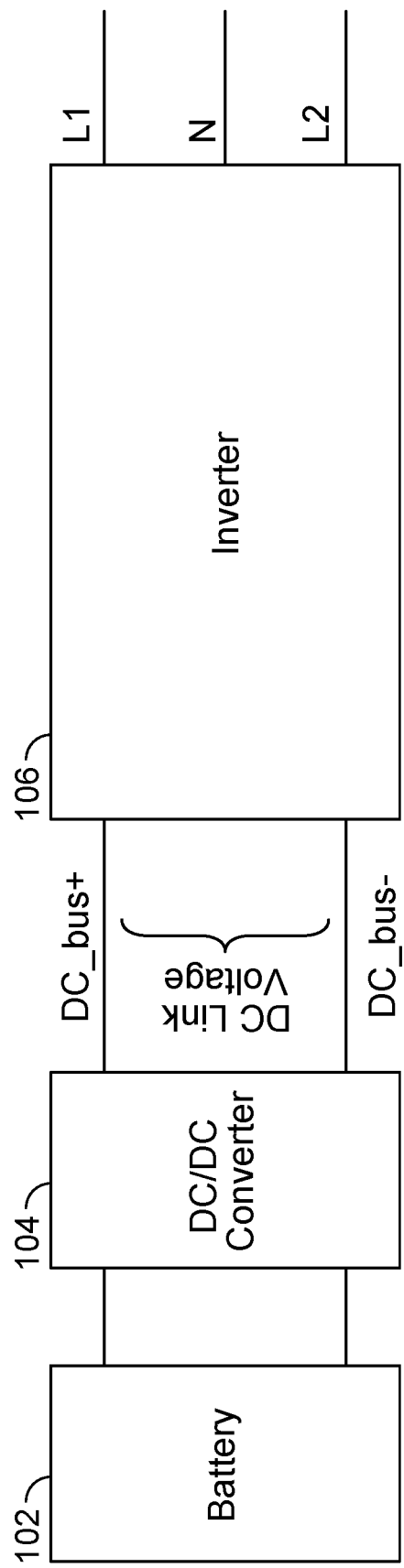
FIG. 1 illustrates an embodiment of an energy storage device connected to an inverter.

FIG. 1 illustrates an embodiment of an energy storage device connected to an inverter. In this example configuration, the energy storage device is a battery 102 (another example of an energy storage is fuel cell storage), whose outputs are connected to the inputs of DC/DC converter 104. The output of the DC/DC converter is then connected to a DC (Direct Current) bus, where the voltage across the positive bus (DC_bus+) and the negative bus (DC_bus−) is referred to as a DC link voltage. The DC link is also referred to as the full DC bus, where the DC link is a bus that links the DC output of the DC-DC converters to the input of the inverter. The input of the inverter 106 is connected to the DC bus, which then takes DC power on the DC bus and converts into an AC power signal.

In this example, the DC/DC converter is configured to step up the output voltage of the battery to the desired voltage across the positive and negative terminals of the DC bus. As one example, suppose that the output voltage of the battery is 40V (volts), and the DC link voltage across the DC bus is to be 400V. In the example configuration shown in FIG. 1 (where the outputs of the DC/DC converter are connected to the positive DC bus and the negative DC bus—that is, across the entire DC bus), the DC/DC converter steps up the voltage by a factor of 10.

The efficiency of DC/DC converters decreases for large step-up ratios. It would be beneficial if DC/DC converters with smaller step-up ratios could be used, as this would improve the efficiency of the DC/DC converters.

Split DC Bus Architecture

Described herein are embodiments of a split DC bus architecture. Using embodiments of the techniques described herein, more efficient DC/DC converters with smaller step-up ratios may be used. As will be described in further detail below, in various embodiments, to facilitate the use of DC/DC converters with smaller step up ratios, rather than stepping up the battery voltage levels to the full DC link voltage (as shown in the example of FIG. 1), the energy storage voltages are stepped up or otherwise boosted to half of the DC link voltage.

Figure 2:
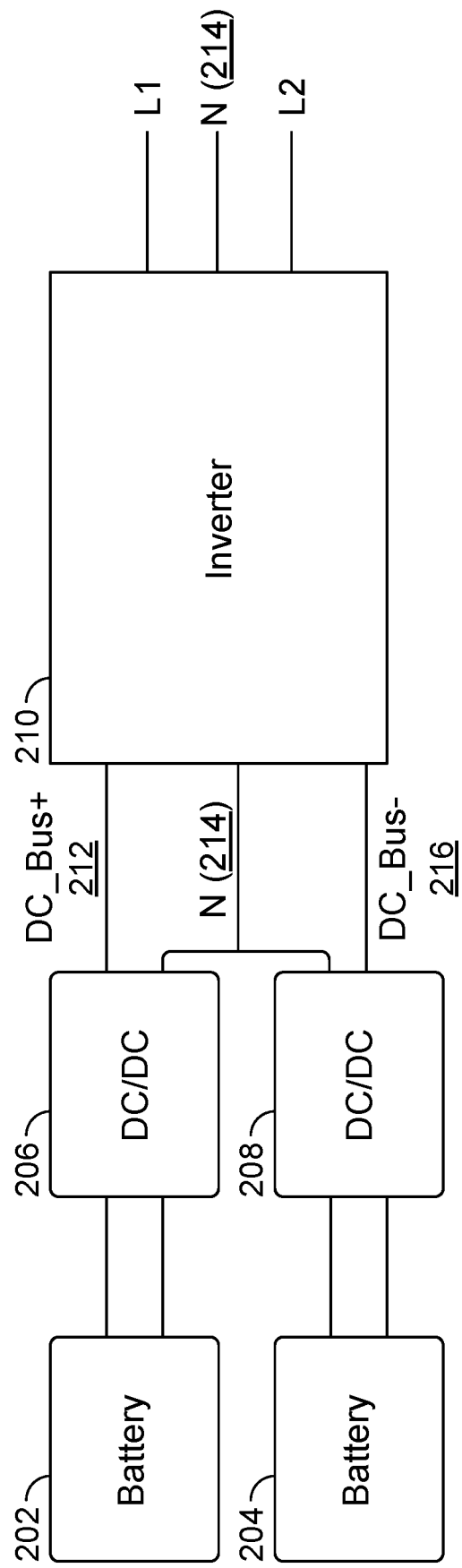
FIG. 2 illustrates an embodiment of an energy storage device connected to an inverter via a split DC bus architecture.

FIG. 2 illustrates an embodiment of an energy storage device connected to an inverter via a split DC bus architecture. In this example, suppose that a home energy storage system includes two battery modules (202 and 204), each with a respective DC/DC converter (206 and 208, respectively). In this example, each DC-DC converter is connected in a manner such that each one takes half of the DC link.

This is in contrast to systems such as that shown in the example of FIG. 1, where the DC-DC converter is configured to step up the battery DC output voltage to the full DC link voltage. Such existing systems effectively provide a single battery with a DC-DC converter with a high step-up ratio. For example, if the DC link voltage is 400V, and the DC output of the battery is 40V, then the DC-DC converter would be configured to have a step-up ratio of 1:10.

In the split bus architecture shown in the example of FIG. 2, and as described herein, instead of having a DC-DC converter that spans the full DC link voltage, the DC-DC converters are split into two halves, where one DC-DC converter handles half of the DC link voltage from the positive DC bus (DC Bus+ 212) to neutral 214 (e.g., 0V to +200V), and the other DC-DC converter handles the other half of the DC link voltage (e.g., 0V to −200V) from neutral 214 to the negative DC bus (DC Bus− 216). The full DC link voltage across the bus is still 400V.

As shown in this example, each DC-DC converter is connected in a manner such that each one connects to a different half of the split DC bus. In this example, each DC-DC converter takes half of the DC bus, thereby "splitting" the DC bus in this split-bus DC architecture. With respect to the voltage across the DC bus, adding the voltage from the positive DC bus to the voltage from the neutral to the negative DC bus results in a full DC link voltage.

The splitting described above provides various advantages. For example, compared to the example of FIG. 1, the conversion ratio for each DC-DC converter is reduced from 10× to 5× (stepping up from 40V to 200V, rather than from 40V to 400V). The lower step-up ratio that is allowed via the split DC bus architecture provides various benefits. For example, with a lower step-up ratio, the DC-DC converters are more efficient. Another example benefit is that the DC-DC converters are easier to design and optimize.

As shown in this example, rather than connecting one output of a DC/DC converter to the positive DC bus and the other output of the DC/DC converter to the negative DC bus as shown in the example of FIG. 1, for a given DC/DC converter, one of its outputs is connected to neutral, and the other output is connected to either the positive bus or the negative bus.

Embodiments of a split DC bus inverter architecture to support such types of connections between DC/DC converters and the input of the inverter 210 are described below in conjunction with FIG. 3.

Figure 3:
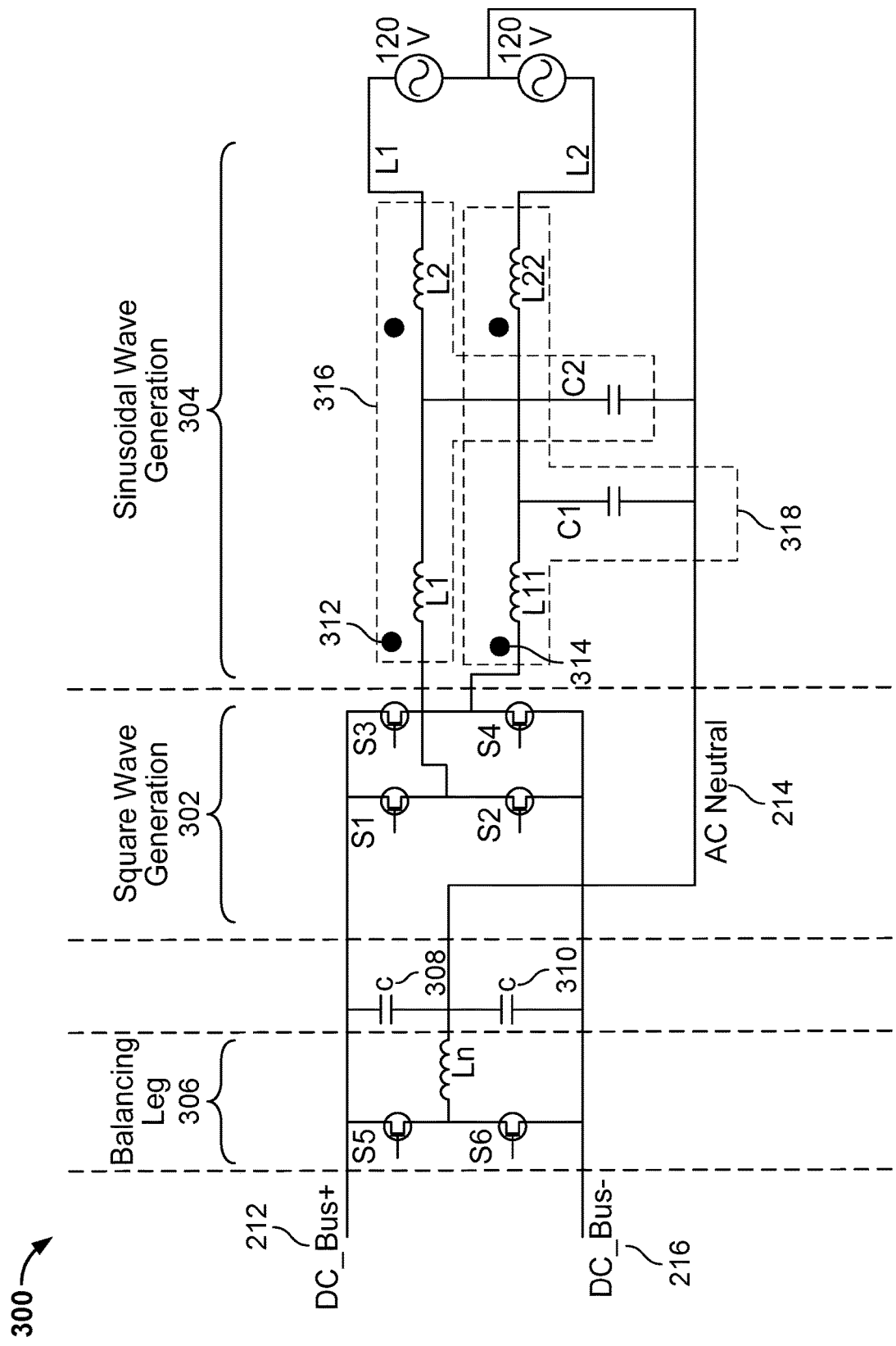
FIG. 3 illustrates an embodiment of an inverter with a split DC bus architecture.

FIG. 3 illustrates an embodiment of an inverter with a split DC bus architecture. In some embodiments, inverter 300 is an example of inverter 210 of FIG. 2. In this example, the inverter is a voltage source inverter topology, where the inverter includes a voltage source mechanism. In the example shown, the inverter is a split phase inverter with a square wave generation portion 302, a sinusoidal wave generation portion 304, and neutral balancing leg 306. In the example of FIG. 3, the inverter has a split phase AC output.

In this example, in which the inverter is used in conjunction with a split bus architecture, the inverter DC bus includes two capacitors (308 and 310) in series, with a midpoint connected to AC neutral (214). This is in contrast to inverter architectures such as those used in conjunction with the configuration shown in FIG. 1, where there is a single capacitor that goes across the DC bus (from the DC positive bus to the DC negative bus). The capacitors 308 and 310 are referred to herein as "split capacitors," or "DC link capacitors." The DC link capacitor between the positive DC bus and neutral is also referred to herein as the "upper side" DC link capacitor, and the capacitor between neutral and the negative DC bus is also referred to herein as the "lower side" DC link capacitor.

In this example, there is a capacitor for each "half" of the DC bus. For example, capacitor 208 is between the positive DC bus and neutral, and capacitor 310 is between neutral and the negative DC bus.

Figure 4:
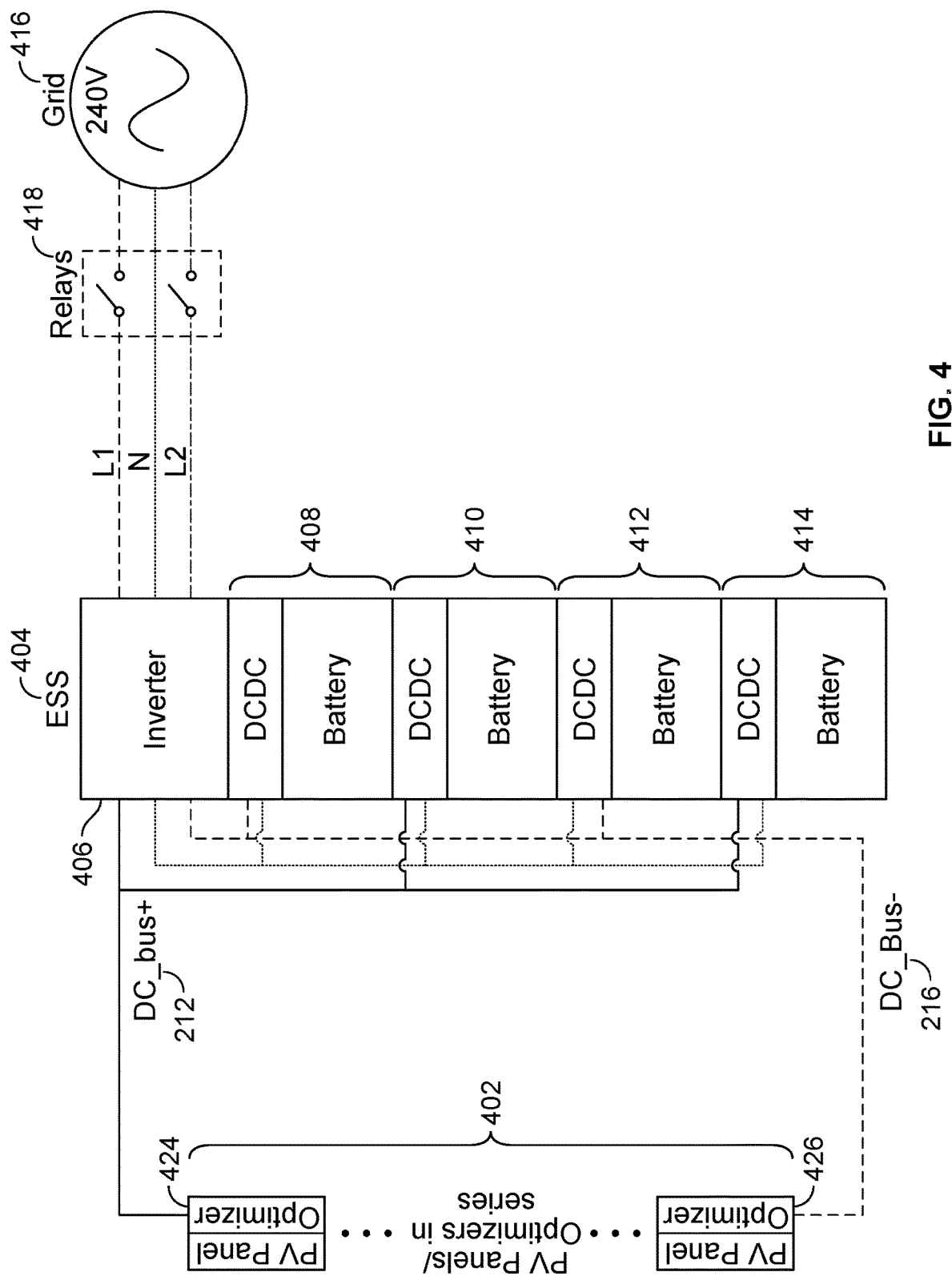
FIG. 4 illustrates an embodiment of an electrical power system architecture.

In this example, and as shown in further detail in the example of FIG. 4, the inverter is included in a power system that includes an energy storage system (ESS) that, for example, includes battery modules. In some embodiments, the battery modules in the system connect to one capacitor or the other (to capacitor 308 or 310). For example, in the system of FIG. 4, two battery modules are connected to each half of the bus. Referring to the example of FIG. 2, each of the battery modules is connected to a respective half of the bus. In some embodiments, the balancer leg 306 (which includes switches S5 and S6 and inductor Ln) of the inverter is a third phase that is connected directly to the midpoint of the bus (neutral 214). The balancer leg is used, for example, to hold the midpoint of the bus at half the voltage of the bus, such that the voltage across the upper-side DC link capacitor and the voltage across the lower-side DC link capacitor are the same (i.e., balanced). As will be described in further detail below, the capacitor voltages may become unbalanced if different loads are connected across the outputs of the inverter (e.g., across L1 to N, or across L2 to N). That is, if different loads are put across the two lines, then the voltages of the two capacitors may become unbalanced (i.e., not the same, or different from each other by more than a threshold).

In some embodiments, the balancer leg 306 achieves the aforementioned balancing by moving current from the top half to the bottom half, or vice-versa, in order to regulate the two halves to be equal to each other. In other embodiments, as will be described in further detail below, the DC/DC converters, which are each clamped to a corresponding DC link capacitor, are configured to perform the balancing, instead of, or in conjunction with, the balancing leg described above. For example, as will be described in further detail below, the DC-DC converters are used to actively balance the capacitor voltages. Further details regarding the use of the balancing leg and/or DC-DC converters to balance the DC link capacitors are described below.

As shown in this example, the inverter has a split phase output. There are two different outputs, L1 and L2. There is either 120V between L1 to N, or L2 to N (where they are out of phase), or the output is 240V between L1 and L2 (as the 120V AC outputs are out of phase, and their difference is 240V). In this way, there are either +/−120V available, or 240V available (depending on how they are combined). In this example, while 120V and 240V are provided as numerical values for illustrative purposes (such as in North American residential applications), other output voltages may be generated for other applications or jurisdictions.

As shown in the example of FIG. 3, the inverter includes two portions, a square-wave generation portion 302, and a sine-wave generation portion 304, where the sine wave generation portion is configured to convert the square-wave into a sinusoidal wave by removing or filtering out higher frequency components. For example, inversion of the DC power from solar panels and/or battery storage is performed by manipulation of switches S1, S2, S3, and S4, resulting in generation of a high frequency square waveform across nodes 312 and 314. In this example, the output of the square wave generation portion is a high frequency square PWM (pulse-width-modulated) waveform. This voltage waveform is not sinusoidal, and the current may not be exactly sinusoidal. In the example of FIG. 3, an LCL filter is used to convert the square wave to, for example, a sinusoidal wave (e.g., by removing or filtering out various frequencies or harmonics). Other types of filters may be used in various embodiments. In various embodiments, the switches are implemented using power transistors (e.g., IGBTs (insulated-gate bipolar transistors), MOSFETs (metal-oxide-semiconductor field-effect transistor), etc.).

With respect to the filters, in this example, the split phase inverter includes two LCL (inductor-capacitor-inductor) filters. For example, the first LCL filter (316) includes inductor L1, capacitor C2, and inductor L2. The second LCL filter (318) includes inductor L11, capacitor C1, and inductor L22. As shown in this example, the input to the LCL filter 316 is controlled via switches S1 and S2, and the input to the LCL filter 318 is controlled via switches S3 and S4.

Each of the LCL filters provides half of the split phase output (e.g., between L1 to N, and between L2 to N). In this example, the inverter is configured to convert the DC output of the DC-DC converters (which are connected to the battery blocks) and/or the DC power output of the PV panels to AC (Alternating Current). As described above, for a North American residential context, the output of the inverter is a split phase output that can provide either 120V AC or 240V AC, where other outputs may be generated with different characteristics for different regions with different power standards.

As described above, the sinusoidal output is generated as a result of filtering a square waveform, where the square waveform is generated by controlling inverter switches (e.g., via PWM—pulse width modulation). The square waveform is generated by the switches from the DC output of the DC-DC converters and/or PV array. In some embodiments, the switches performing the conversion are connected to the DC output of the DC-DC converters and/or PV array via the DC bus described herein, which links the inverter-side with the battery block/DC-DC converter side and the PV array side. As described above, this DC bus is also referred to as a DC link. As one example, the voltage across the DC link should be high enough (or above a minimum threshold voltage) to run the inverter to provide plus/minus 120V AC (or 240V AC) split phase output. In this example, the DC link voltage across the DC bus is controlled to be 400V (other DC link voltages, or full DC bus voltages may be used as appropriate). For example, the total DC link voltage is regulated by the DC-DC converters to a preferred value, such as 400V.

For example, the pair of switches S1 and S2, and the pair of switches S3 and S4 are connected to the DC bus, which are at +200V and −200V relative to neutral. The switches are controlled according to a modulation index (e.g., via sinusoidal pulse width modulation (SPWM)). Supposing a 400V DC link, any AC voltage with an amplitude lower than 400V can be produced. That is, the maximum amplitude that can be produced between L1 and L2 would be 400V. For example, the output of the inverter (before the filtering) is a square waveform (e.g., a series of pulses generated according to PWM with a specified duty cycle, which can be varied) with amplitude at either +200V or −200V. The filter is applied to this square waveform to generate the AC +/−120V split phase output. The amplitude, or peak of the AC output voltage will not exceed the DC bus voltage. The filter (e.g., LCL filter described above), which includes capacitors and inductors, smooths out the square waveform, removing high frequency components.

Example Power System

FIG. 4 illustrates an embodiment of an electrical power system architecture. In the example of FIG. 4, the electrical power system includes an array of photovoltaic (PV) panels 402, and an energy storage system (ESS) 404. As shown in this example, each of the PV panels is connected to a corresponding PV converter (also referred to herein as an optimizer, maximizer, or module-level power electronics (MLPE)). The power optimizers are arranged in series. In this example, the ESS 404 includes inverter 406. In this example, the inverter 406 is of a split DC bus architecture, and is an example of inverter 300 of FIG. 3. The ESS also includes battery/DC-DC converter modules 408, 410, 412, and 414. Each battery module includes a battery storage (or any other type of energy storage as appropriate) and a DC-DC converter. As shown in this example, each DC/DC converter has two outputs. One of the output terminals connects to one of the positive or negative DC bus, while the other output terminal connects to a neutral node. That is, each DC/DC converter connects to one half of the DC bus (rather than across the full DC bus, as shown in the example of FIG. 1).

The inverter connects to the electrical wiring of a site (e.g., home site). For example, the L1 and L2 lines connect to the main breaker panel of the home. The inverter may also be connected to grid 416 (e.g., utility grid). In the example shown, a set of relays (418) is between the inverter and the grid, allowing control of whether the inverter is connected to the grid (where the inverter is then referred to as operating in a "grid-tied" or "grid-connected" mode), or disconnected from the grid (where the inverter is then referred to as being in a "standalone" mode).

In the example of FIG. 4, the inverter is of a split bus architecture, as described above, where the inverter DC (Direct Current) bus at the input of the inverter is split into two halves, a positive half of the DC bus 212 (DC_Bus+), and a negative half of the DC bus 216 (DB_Bus−). As shown in this example, the positive side of the DC bus (212) is connected to an output terminal of the "top" optimizer 424, and the negative side of the DC bus (216) is connected to an output terminal of the "bottom" optimizer 426.

Embodiments of Connecting DC/DC Converter Outputs to a Split DC Bus

The following are further embodiments regarding connecting of battery block/DC-DC converters to a split DC bus. In this example, each battery block is associated with a corresponding DC-DC converter. For example, an energy storage system may include a scalable number of battery blocks, as shown in the example of FIG. 4, depending on the amount of backup storage desired. For example, suppose one battery block has a capacity of 5 kwh. A two-battery block system has a capacity of 10 kwh, and so on. In some embodiments, each battery block is connected to a DC-DC converter to perform the aforementioned stepping-up of voltage. For example, a battery block has two output terminals, a positive terminal and a negative terminal. The outputs of the battery block are connected to inputs of a DC-DC converter. The DC-DC converter has at least two output terminals, one of which is a positive DC-DC converter output, and another of which is a negative DC-DC converter output. As described herein, the output of each DC-DC converter is connected to half of the DC bus.

FIGS. 5A-5D illustrate embodiments of various configurations of connecting battery block/DC-DC converter modules to a split DC bus architecture.

Single Battery Block/DC-DC Converter Configuration

FIG. 5A illustrates an embodiment of connecting a single battery block coupled with a DC-DC converter to a split DC bus. In this example, the DC-DC converter is connected to half of the DC bus (and not, for example, across the entire DC bus). The output of the battery block is stepped up by the DC-DC converter to half of the DC link voltage (e.g., 200V in this example with a 400V full DC bus voltage). In this example, the output of the battery block/DC-DC converter module 502 is connected to the "top" half of the DC bus, across the positive DC bus 212 and the neutral line 214. In a single battery configuration, the battery block/DC-DC converter may also be connected to the "bottom" half of the DC bus, across the negative DC bus 216 and the neutral line 214. In the single battery block case, one half of the DC bus is not connected to a DC-DC converter. Further details regarding balancing of the voltages on the split DC link capacitors 308 and 310 in such a scenario will be described in further detail below. For example, as will be described in further detail below, balancing leg 306 (including inductor Ln and switches S5 and S6) is used to redistribute current from one DC link capacitor to the other (e.g., pull current from one capacitor and dump it on the other capacitor) in order to balance the voltages on the capacitors (so that the magnitude of the voltages on them is the same). In this way, each half of the bus is balanced to be 200V, resulting in a 400V full DC link voltage.

Double Battery Block/DC-DC Converter Configuration

FIG. 5B illustrates an embodiment of connecting a group of two battery blocks coupled with DC-DC converters to a split DC bus. Each DC-DC converter takes half of the DC link/bus. For example, the output of the first DC-DC converter of battery/DC-DC module 504 is connected between the positive DC bus 212 and neutral 214, and the output of the second DC-DC converter of battery/DC-DC module 506 is connected to neutral 214 and negative 216. The magnitude of the output voltage of each of the DC-DC converters is half of the DC link voltage (e.g., 200V in a full 400V DC bus). The combined output of the DC-DC converters in the grouping is 400V. In this example, the grouping of two battery blocks is in series, with the common node between the two DC-DC converters connected to the neutral line. The voltages, relative to neutral, are 200V on the positive DC bus, 0 at neutral, and −200 volts.

In this example, if each half of the group provides 5 kW of power, then combined, the two battery blocks are configured to provide 10 kW of power to the inverter.

In this example, the positive output of DC-DC converter of module 504 is connected to the positive side of the DC bus, and the negative output of the DC-DC converter is connected to neutral. For the other DC-DC converter in module 506, the positive output of the DC-DC converter is connected to neutral (and is electrically connected to the negative output of the other DC-DC converter 504, thereby connecting the two DC-DC converter outputs in series), and the negative output is connected to the negative side of the DC bus.

As described above, the ESS is scalable, allowing different numbers of battery blocks to be included in energy storage system. In some embodiments, when connecting more than two battery blocks to the split DC bus, groups of one or two battery blocks are added in parallel to the split DC bus (e.g., depending on whether there is an odd or even number of battery blocks to be used), as will be shown in the examples of FIGS. 5C and 5D.

Triple Battery Block/DC-DC Converter Configuration

FIG. 5C illustrates an embodiment of connecting three battery blocks coupled with DC-DC converters to a split DC bus. In this example, the three battery blocks are connected by connecting a grouping of two battery blocks (as shown in FIG. 5B) in parallel with a single battery block 514 (connected, for example, as shown in FIG. 5A, to half of the DC bus).

Quadruple Battery Block/DC-DC Converter Configuration

FIG. 5D illustrates an embodiment of connecting four battery blocks coupled with DC-DC converters to a split DC bus. In this example, the four battery blocks (where a battery block includes a battery and corresponding DC-DC converter) are connected by connecting two groups (516 and 518) of two battery blocks each (where each grouping of two battery blocks is connected as shown in FIG. 5B), where the two battery block groupings are connected in parallel with each other. For example, grouping 516 is connected in parallel with grouping 516, with the output voltage across each of the groupings being 400V (full DC link voltage)

An arbitrary number of battery blocks may be connected by scaling and connecting/wiring different combinations of battery blocks together, as shown in the examples above. For example, in a system with an even number of battery blocks, groupings of two battery blocks in series are connected in parallel with each other to the DC bus. In a system with an odd number of battery blocks (and that is also more than one battery block), groupings of pairs of battery blocks are connected to the DC bus in parallel with a single battery block that is connected to one of the halves of the split DC bus.

Balancing Voltages Across Upper and Lower Side DC Link Capacitors

The following are embodiments of balancing the voltages of the two halves of the DC bus (so that they are the same voltage in magnitude). This includes balancing voltages across the split DC link capacitors (e.g., capacitors 308 and 310 of inverter 300 of FIG. 3) so that the magnitude of the voltages across each of the DC link capacitors is the same.

Ideally, in some embodiments, the DC link capacitor voltages are the same (i.e., balanced). For example, if the full bus voltage is 400V, then ideally each capacitor voltage is equal (e.g., 200V). Having a same voltage on each capacitor allows for the selection of the same capacitors with the same voltage ratings for the application. However, if there is a different load on the lines (e.g., connected to the AC output of the inverter), then the two DC link capacitor voltages may become unbalanced.

In the split DC bus architecture described herein, half of the DC link voltage is put on each capacitor, such that the two halves may be designed to the same specification, in a balanced manner. This is applicable, for example, to a typical scenario in which the inverter is run with a balanced load. However, imbalances may occur. For example, imbalances may occur due to various reasons, such as imbalance on the loads (i.e., unbalanced loads), or because the state of charges on the battery blocks connected to the two halves of the split DC bus are different.

One way to account for such imbalances is to size the capacitors for the most extreme case, in which a single capacitor in the split capacitors sees the full DC link voltage (e.g., of 400V), and the other capacitor sees 0V. In this case, the capacitor is sized for the highest voltage possible across the DC link. This is undesirable for several reasons. For example, having a capacitor of this size introduces additional cost. However, if the capacitors are not oversized for the worst case (e.g., sized for 200V), but an imbalance occurs and one capacitor sees much more than the rated 200V, then the capacitor may become damaged due to stressing of the component.

Described herein are embodiments of control mechanisms for balancing voltages across split capacitors in a split DC bus architecture. Using embodiments of the voltage balancing techniques described herein, the split capacitors may be sized for an operating window of typical usage (without requiring oversizing for extreme scenarios), while imbalances are minimized and high voltages on a DC link capacitor are avoided (thereby reducing stress and damage to capacitors).

The following are embodiments of balancing the split capacitor voltages in the split-bus architecture. In some embodiments, the balancing control mechanisms described herein operate by adjusting the amount of charge on the split capacitors, thereby controlling their voltages. In some embodiments, a balancing leg is used to perform the balancing. In other embodiments, DC-DC converters on each half of the bus are configured to perform the balancing by utilizing charge controllers of the DC-DC converters to move charge on and/or off of the DC link capacitors. In some embodiments, both the balancing leg and the DC-DC converters are used together to perform balancing.

For example, in the embodiment of the inverter shown in FIG. 3, the inverter includes a balancing leg including two switches (S5 and S6) and an inductor (Ln). In the example split bus architecture described herein, both the DC-DC converters and the balancing may be used to balance the split bus capacitor voltages. For example, if there are DC-DC converters connected to each half of the bus, then each of the DC-DC converters clamps to a DC link capacitor voltage, and can be used to facilitate balancing of the two DC link capacitors. The two balancing mechanisms may be used individually or in combination.

Figure 6A:
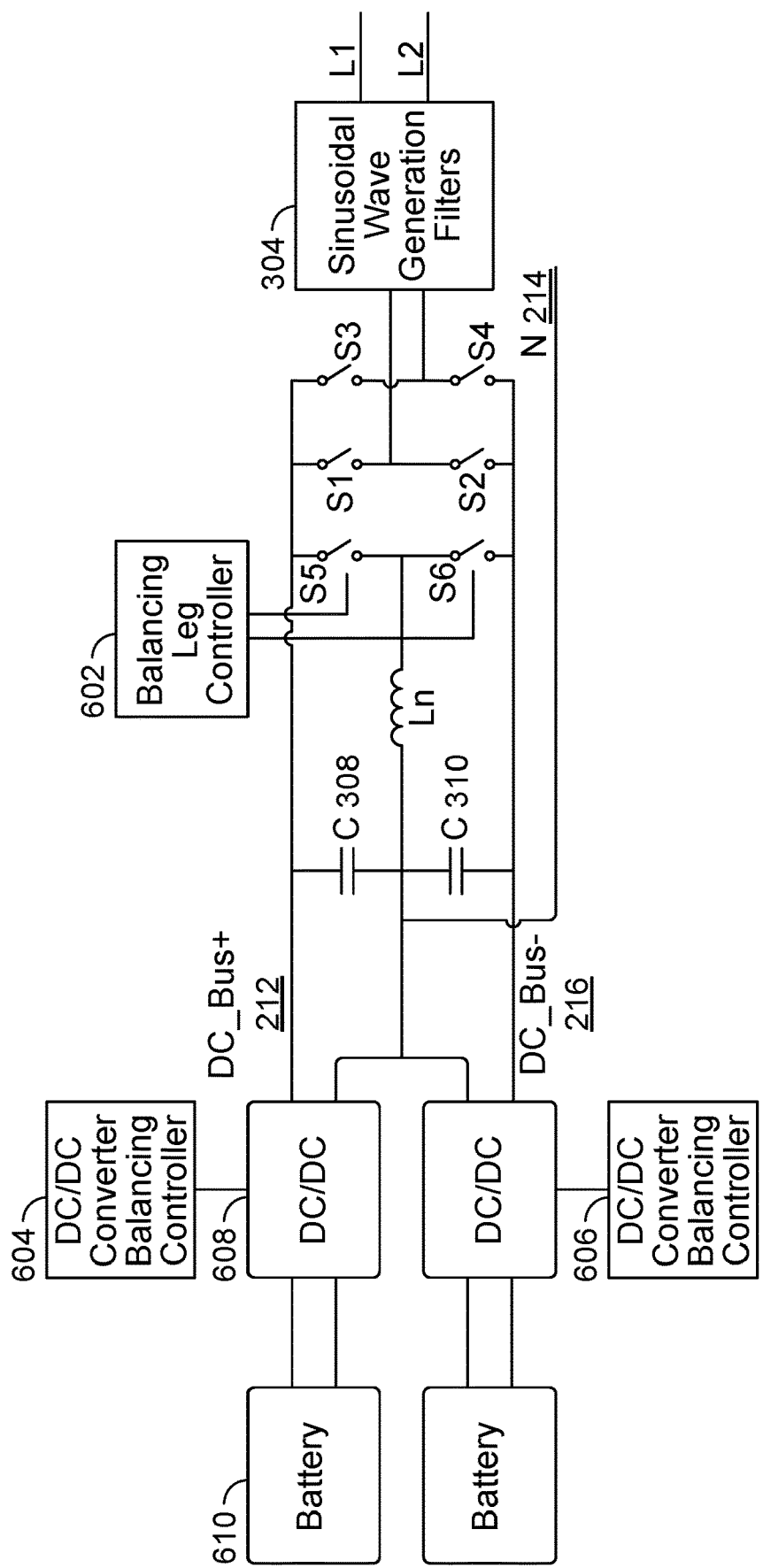
FIG. 6A illustrates an embodiment of balancing half DC bus voltages in a split DC bus architecture.

FIG. 6A illustrates an embodiment of balancing half DC bus voltages in a split DC bus architecture. In the example of FIG. 6A, the balancing leg (S5, S6, and Ln) is available to be used to perform balancing. Because there are DC-DC converters clamped to each half of the DC bus, the DC-DC converters may also be used to perform balancing, further details of which will be described below.

Balancing Leg

Embodiments of balancing using the balancing leg are described first. In this example, if an imbalance is detected between the voltages across the split DC link capacitors, the switches (S5 and S6) are controlled to move charge from one DC link capacitor to the other DC link capacitor until their voltages are balanced. For example, if there is any imbalance, the switches are controlled to allow current to flow between the capacitors until they have the same measured voltage. For example, the balancing leg is controlled (e.g., by balancing leg controller 602) to circulate power from one side of the split DC bus to the other half. As described above, in some embodiments, the balancer leg is a third phase of the inverter that is connected directly to the midpoint of the bus. In some embodiments, the balancer leg is used to hold the midpoint of the DC link at half of the DC link voltage. This is achieved, in some embodiments, by the balancer leg moving current from one half of the bus to the other half, or vice-versa, in order to regulate the two halves of the bus to be equal to each other.

In this example, in the balancing leg, the switches are not introducing additional charge to the capacitors from another source. That is, the balancing leg does not produce more charge. Rather, the balancing leg actively balances the charge between the two DC link capacitors by taking charge from one DC link capacitor and moves it to the other DC link capacitor (e.g., causing controlled current flow). In this case, DC link voltages are balanced by redistributing or diverting charge across the DC link capacitors.

The opening/closing of the switches of the balancing circuit establishes or otherwise controls current distribution pathways for moving or transferring charge between the two split DC link capacitors. The inductor (Ln) modulates the change in current when opening the switches (e.g., to prevent sudden large currents and rapid discharge, which may cause damage to the capacitors).

The following is an example of controlling the balancing leg (e.g., the switching devices S5 and S6, which controls the distribution of charge via the inductor) to balance the voltage on the DC link capacitors. In this example, the control of the balancing leg is performed by the balancing controller 602 (which includes, for example, a processor and memory). As one example, the voltages on the DC link capacitors are determined using voltage sensors. As one example, the inverter is configured to detect its input voltage. For example, the inverter is configured to determine the voltage across the DC bus, as well as the voltage between the positive DC bus and neutral (which is the voltage across the "upper side" DC link capacitor") and the voltage between neutral and the negative DC bus (which is the voltage across the "lower side" DC link capacitor"). The difference between the DC link capacitor voltages is determined. Based on the determined difference between the DC link capacitor voltages, the switches of the balancing leg (S5 and/or S6) are turned on or off, facilitating active charge transfer from one DC link capacitor to the other DC link capacitor. The switches are controlled to facilitate charge transfer until the detected or monitored difference between the upper-side and lower-side DC link capacitor voltages are balanced (e.g., the same or within a threshold). In this way, the voltage is controlled by actively controlling the two switches (S5 and S6) of the balancing leg.

DC-DC Converter Balancing

Next, embodiments of balancing using the DC/DC converters are described. The DC/DC converter-based balancing may be used instead of, or in addition to, the balancing leg.

As described above, with respect to the balancing leg, the balancing leg is configured to balance the DC link capacitor voltages by moving current from one capacitor to the other, where the voltage across the capacitors changes as a function of the amount of charge (and a change in charge over time, current, results in a change in voltage over time).

The movement of charge on or off a capacitor may also be controlled via the DC-DC converter connected across the DC link capacitor, where the DC-DC converter is controlled to provide current to a split capacitor, or draw charge from it, to change the voltage across the capacitor.

For example, the DC link capacitors are analogous to a water tank (that holds charge in this example). A DC-DC connects a battery block with a DC link capacitor. The battery block is a large tank of water (electric charge). The DC-DC converter may be controlled in a manner akin to a faucet to put more charge on a DC link capacitor. For example, suppose that due to different loads on L1 or L2, there is an imbalance on the DC link capacitors (e.g., because charge is being pulled unequally from the DC link capacitors). If more charge is pulled out of a DC link capacitor, the DC-DC converter clamped to the DC link capacitor is controlled (e.g., by a DC/DC converter balancing controller such as DC/DC converter balancing controller 604 or 606) to supply more charge to the DC link capacitor. Similarly, if the other DC link capacitor has more charge pulled from it due to the loads at the output of the inverter, the DC-DC converter attached to that DC link capacitor charges up the DC link capacitor to which it is connected.

As shown in this example, the charging of the DC link capacitor by a DC-DC converter is controlled. The following is another example of controlling a DC-DC converter to balance DC link capacitors. In some embodiments, the controlling of the DC-DC converter is performed by DC-DC converter balancing controllers 604 and 606. For example, consider DC link capacitor 308. A voltage sensor is used to sense the voltage on the DC link capacitor 308. As one example, the DC-DC converter 608 includes a voltage sensor, or any other sensing mechanism, as appropriate, at its output (where its output is across the same nodes as the DC link capacitor). That is, the DC-DC converter monitors its output voltage, which is also the voltage across the connected DC link capacitor.

In some embodiments, DC-DC converter balancing controller 604 is configured to compare the DC link capacitor voltage against a reference voltage. Suppose that 200V is the reference voltage (e.g., half of desired 400V DC link voltage). However, due to the unbalanced loads, more charge is being pulled out of the capacitor (as compared to the lower-side DC link capacitor 310), causing the voltage of the DC link capacitor 308 to decrease. In some embodiments, the DC-DC converter 608 connected to the DC link capacitor 308 detects this voltage decrease (analogous to detecting that the charge level of the capacitor is decreasing), and in response, draws more current from the battery block to charge up the capacitor. In this way, the balancing controller is also configured to act as a charge controller for controlling charge from a DC link capacitor to a battery, and/or controlling charge from the battery to the DC link capacitor.

The observed voltage on the DC link capacitor 308 is compared, by balancing controller 604, to a desired reference voltage (e.g., 200V). If, for example, the observed voltage is lower than the reference voltage, the DC-DC converter 608 is controlled by the controller 604 to draw more current, from the battery block 610 (to which the converter 608 is connected), and provide it into the DC link capacitor 308 in order to cause its voltage to increase to the reference voltage. In this example, by using the same reference voltage for each half of the DC bus, the DC-DC converters will balance the split DC link capacitors by maintaining the same reference voltage (e.g., 200V) on them.

As described above, in some embodiments, the DC-DC converters measure the voltage on their outputs, which are connected to DC link capacitors. If there are, for example, at least two battery blocks in use (and thus two DC-DC converters), then there is at least one DC-DC converter connected to each half of the DC bus. In this way, the voltage across each half of the DC bus may be determined (e.g., via the voltage sensors in the DC-DC converters).

As another example of balancing the DC link capacitors, the voltages on the lower side and the upper side DC link capacitors are determined using the voltage sensors of the respective DC-DC converters attached to the two halves of the split DC bus. The difference between the voltages on the two DC link capacitors is determined. The DC-DC converters (using, for example, charge controllers) are then controlled to provide current to (or draw current from) the DC link capacitors to reduce the difference between the measured voltages across the DC link capacitors, until the DC link capacitors are at the same voltage (or within a threshold amount of each other) (i.e., balanced). As one example, as described above, the inverter measures the voltage across the two halves of the DC bus at its input. The inverter (e.g., microcontroller of the inverter) determines the voltage difference between the two halves, and issues commands to the DC-DC converters (e.g., to the balancing controllers of the DC-DC converters) to provide current to and/or draw current from one or more of the DC link capacitors until the measured difference between the voltages of the DC link capacitors is minimized. In other embodiments, the DC-DC converters are configured to sense the voltage on the respective halves of the DC bus to which they are connected. In some embodiments, DC-DC converters are connected to each other via wiring, through which they may communicate with each other. For example, each DC-DC converter measures its output voltage (which is half of the DC bus), and communicates the measured voltages to the other DC-DC converters. The controllers then coordinate amongst each other to control charge to/from the DC link capacitors to regulate the two halves of the split DC bus to be equal to each other. For example, a DC-DC converter measures the voltage on the half of the bus to which it is connected, and receives, from a DC-DC converter connected to the other half of the DC bus, a measured voltage of the other half of the DC bus. The controller determines the difference between the voltages of the two half buses, and controls the charge to/from the DC link capacitor to which it is connected to adjust its voltage, in order to minimize the difference between the voltages on the DC link capacitors. While each DC/DC converter is associated with its own corresponding controller in this example, in other embodiments, there is a single controller (which may be, for example, located in the inverter module) that monitors and controls multiple DC/DC converter outputs. For example, the overall controller monitors the output voltages of the DC-DC converters (where the DC/DC converters in some embodiments include voltage sensors for measuring their respective outputs, which is the voltage of the DC link capacitor to which the DC/DC converter is connected). In some embodiments, the controller uses the global view of the outputs of the DC-DC converters to instruct the individual DC-DC converters to move charge to/from the capacitors and the batteries to regulate the two halves of the split DC bus to be equal to each other. As shown in the examples described above, in various embodiments, the difference in voltage between the DC link capacitors is monitored. The DC-DC converter charge controllers are then configured to minimize the difference by adjusting the amount of charge on the DC link capacitors.

In some embodiments, balancing using DC-DC converters is performed when there are two or more DC-DC converters (and each half of the DC bus is connected to a DC-DC converter).

In the example of FIG. 6A, the balancing leg and the DC-DC converters may be used individually or in combination to perform balancing of the voltages of the split DC link capacitors. The use of a balancing leg is beneficial in scenarios in which one of the split bus capacitors is floating (and not connected to a DC-DC converter, such that there is not a DC-DC converter that can directly affect the voltage of the capacitor by adjusting the amount of charge on the capacitor via current delivery). Such scenarios include when a branch has a fault (and a DC-DC converter attached to a capacitor is unable to provide current), or when there is only a single battery block in the system, such as in the example of FIG. 6C below (and there is only a DC-DC converter on one half of the DC bus). For example, if an imbalance occurs (and there is not a DC-DC converter to control the voltage on one of the capacitors), then the balancing leg is configured to circulate power from one side of the split DC bus to the other side to equalize the voltages of the two halves of the DC bus.

In the example of the DC-DC converter performing balancing, additional charge to perform balancing is supplied by the battery block. In the case of a balancing leg, the balancing is performed by redistributing charge between the capacitors (rather than drawing current from another source of charge).

The balancing leg and the balancing via DC-DC converters are mechanisms that may be used independently or in conjunction with each other. For example, the balancing may be initiated or triggered sequentially. They may also be used simultaneously to relieve the burden on one balancing mechanism versus the other. When used together, a weighting factor may be used to control the amount of balancing performed by each of the two balancing mechanisms.

Figure 6B:
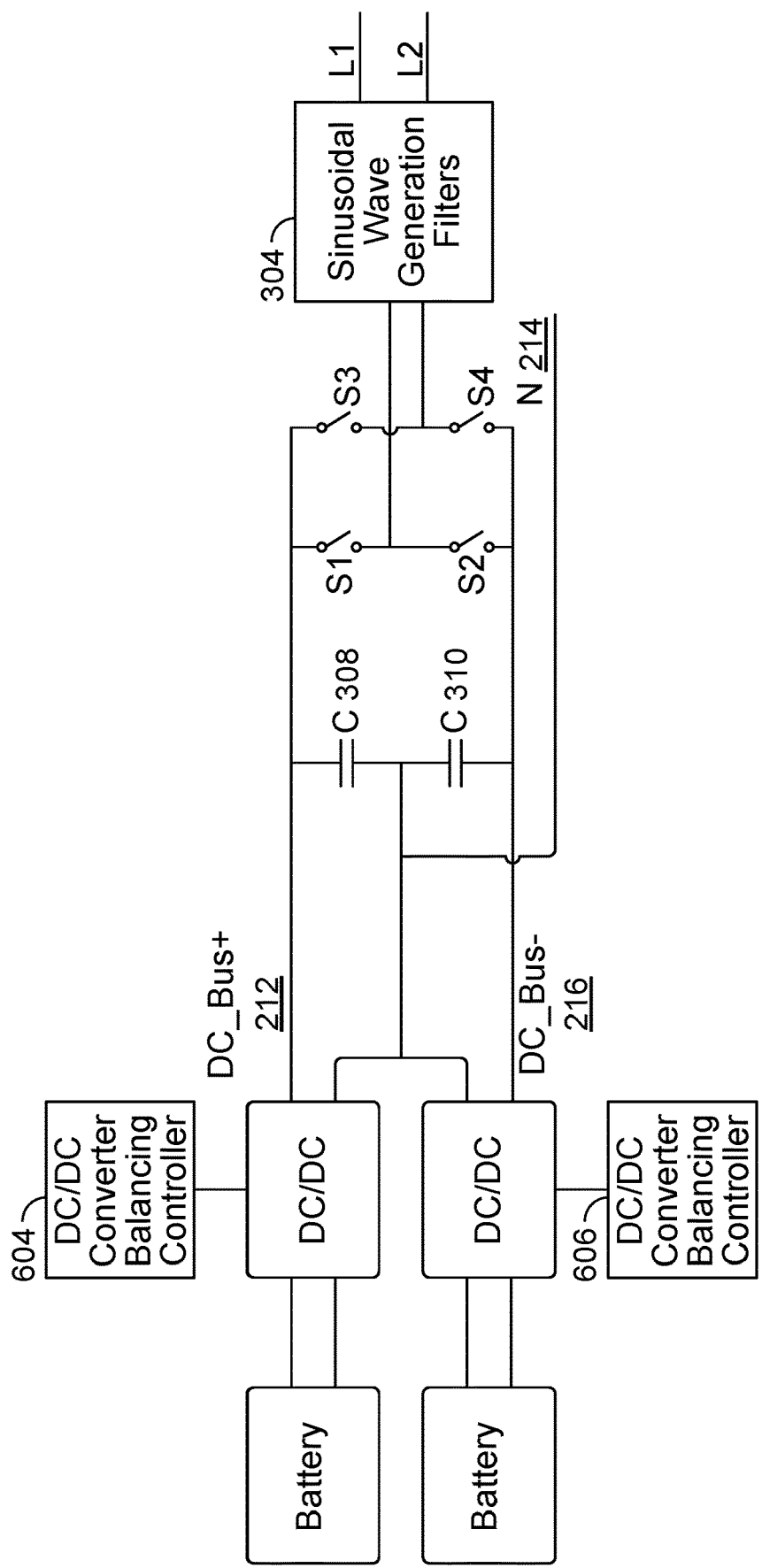
FIG. 6B illustrates an embodiment of an architecture in which balancing is performed using DC/DC converters.

FIG. 6B illustrates an embodiment of an architecture in which balancing is performed using DC/DC converters. In this example, each half of the split DC bus architecture is connected to a DC-DC converter. In this case, because there are DC-DC converters available to balance each of the DC link capacitors, the balancing leg (S5, S6, and Ln) need not be required and can be removed from the inverter in various embodiments to reduce the amount of componentry. In this example case, the DC-DC converters solely perform the balancing. In other embodiments, even if there is at least one DC-DC converter connected to each half of the split DC bus, the balancing leg is still maintained (e.g., as in the example of FIG. 6A), for example as redundancy in case of a branch fault (and there is not a DC-DC converter able to modulate the charge of a DC link capacitor on one half of the split DC bus).

Figure 6C:
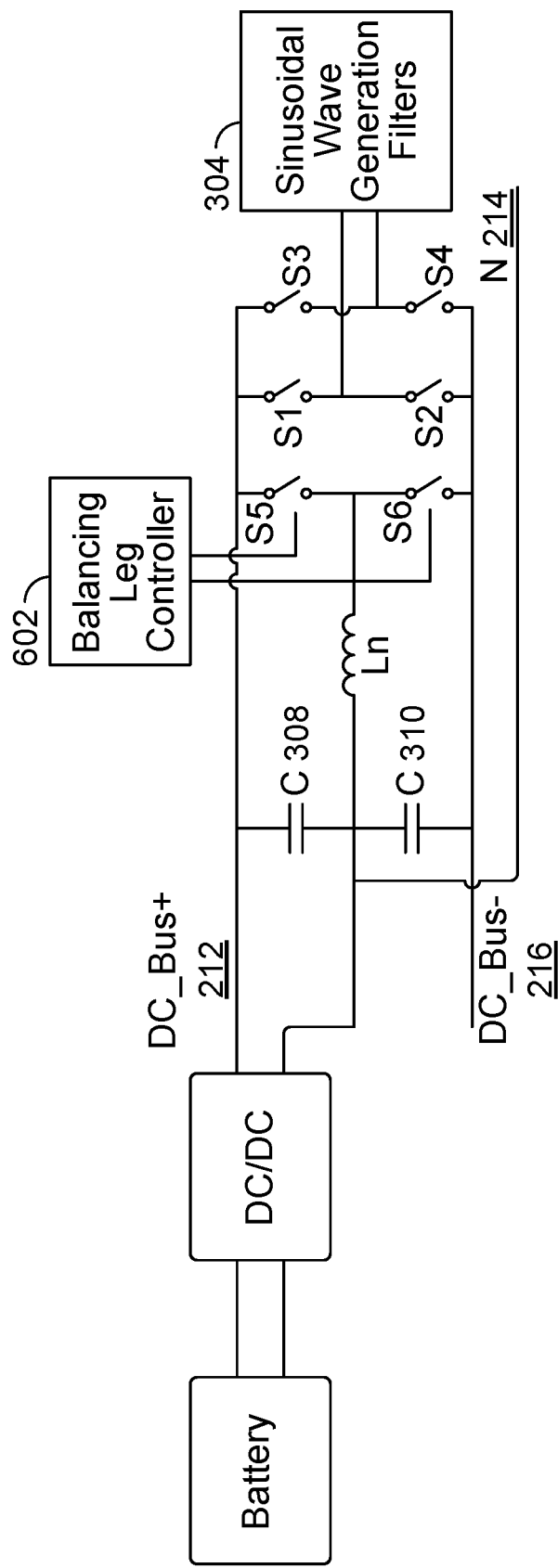
FIG. 6C illustrates an embodiment of balancing split DC link capacitors using a balancing leg.

FIG. 6C illustrates an embodiment of balancing split DC link capacitors using a balancing leg. As described above, one possible battery configuration involves only a single battery block (with corresponding DC-DC converter). In this case, as shown in the examples of FIGS. 5A and 6C, only one of the upper-side or lower-side DC link capacitors is clamped to a DC-DC converter, and the other DC link capacitor is floating. In this case, because there is no DC-DC converter to balance one half of the DC bus (because there is no DC-DC converter clamped to one of the split DC link capacitors), the balancing leg (controlled by balancing leg controller 602 in this example) is used to perform the balancing by redistributing charge between the upper-side and lower-side DC link capacitors.

Figure 7A:
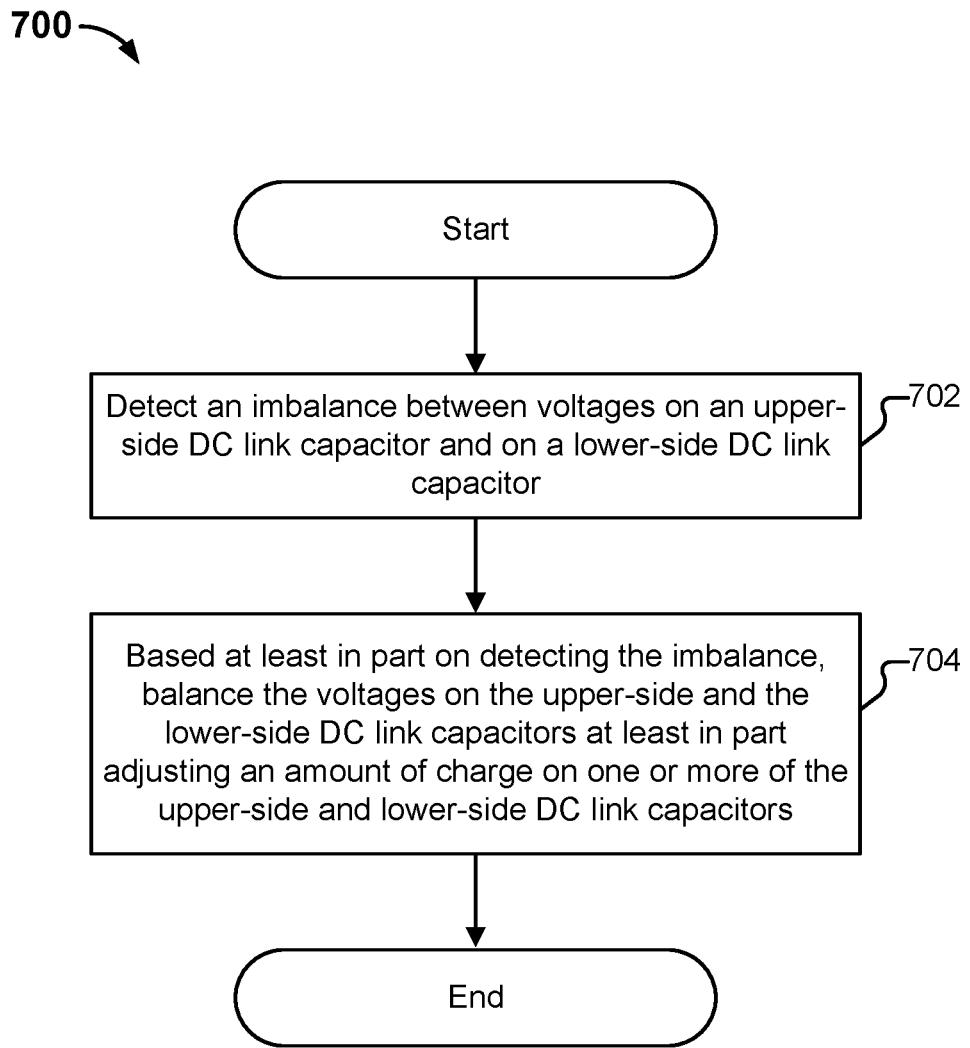
FIG. 7A illustrates an embodiment of a process for balancing DC link capacitors in a split DC bus architecture.

FIG. 7A illustrates an embodiment of a process for balancing DC link capacitors in a split DC bus architecture. In some embodiments, process 700 is executed by a controller such as balancing leg controller 602 and/or a controller such as DC-DC converter balancing controller 604. The process begins at 702, when an imbalance between voltages on an upper-side DC link capacitor and on a lower-side DC link capacitor is detected. At 704, based at least in part on detecting the imbalance, balancing of the voltages on the upper-side DC link capacitor and the lower-side DC link capacitor is performed at least in part by adjusting a charge on at least one of the upper-side DC link capacitor and the lower-side DC link capacitor. As described above, in various embodiments, the balancing is performed by using a balancing leg to redistribute charge between the upper-side and lower-side capacitors, using a DC-DC converter to adjust the charge on a DC link capacitor that is across the outputs of the DC-DC converter, or both.

Figure 7B:
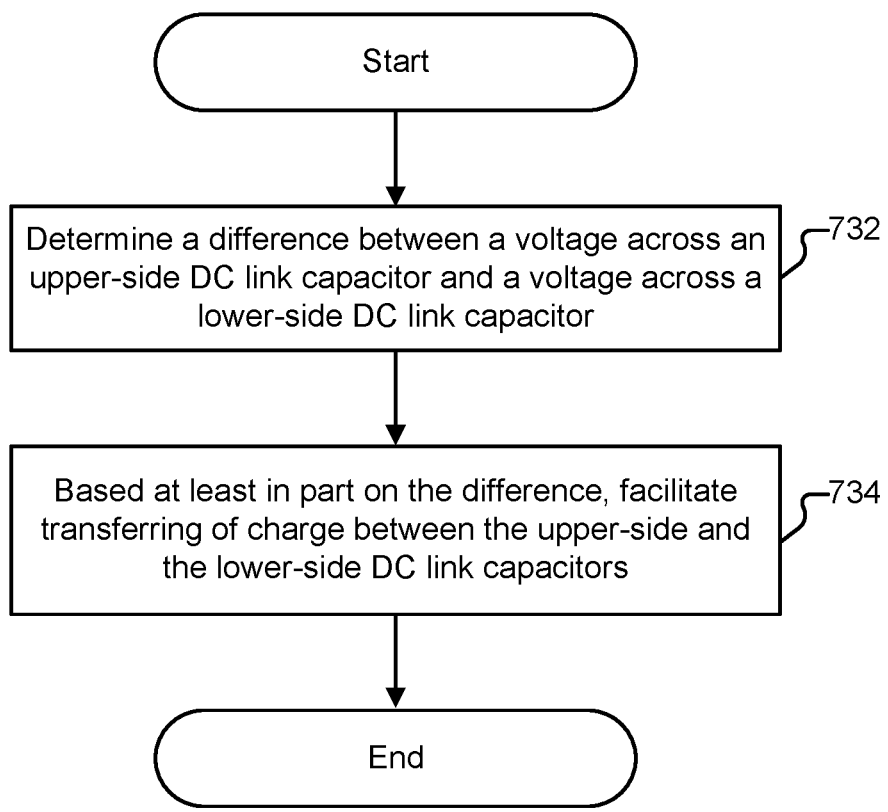
FIG. 7B illustrates an embodiment of a process for balancing DC link capacitors in a split DC bus architecture using a balancing leg.

FIG. 7B illustrates an embodiment of a process for balancing DC link capacitors in a split DC bus architecture using a balancing leg. In some embodiments, process 730 is executed by balancing leg controller 602. In some embodiments, process 700 is implemented using process 730. The process begins at 732, when a difference between a voltage across an upper-side DC link capacitor and a voltage across a lower-side DC link capacitor is determined. The upper-side DC link capacitor and the lower-side DC link capacitor are a pair of DC link capacitors that are across a DC bus. For example, each DC link capacitor in the pair is across a respective half of the DC bus. In some embodiments, half of the DC bus refers to a half of the DC bus between a neutral line and either the positive side or negative side of the DC bus. For example, the upper-side DC link capacitor is located across a positive side of the DC bus and a neutral line. The lower-side DC link capacitor is located across a negative side of the DC bus and the neutral line.

At 734, based at least in part on the difference between the voltages on the upper-side and the lower-side DC link capacitors, transferring of charge between the upper-side and the lower-side DC link capacitors is facilitated (e.g., by controlling opening of switches S5 and S6 of the balancing leg described herein).

Figure 7C:
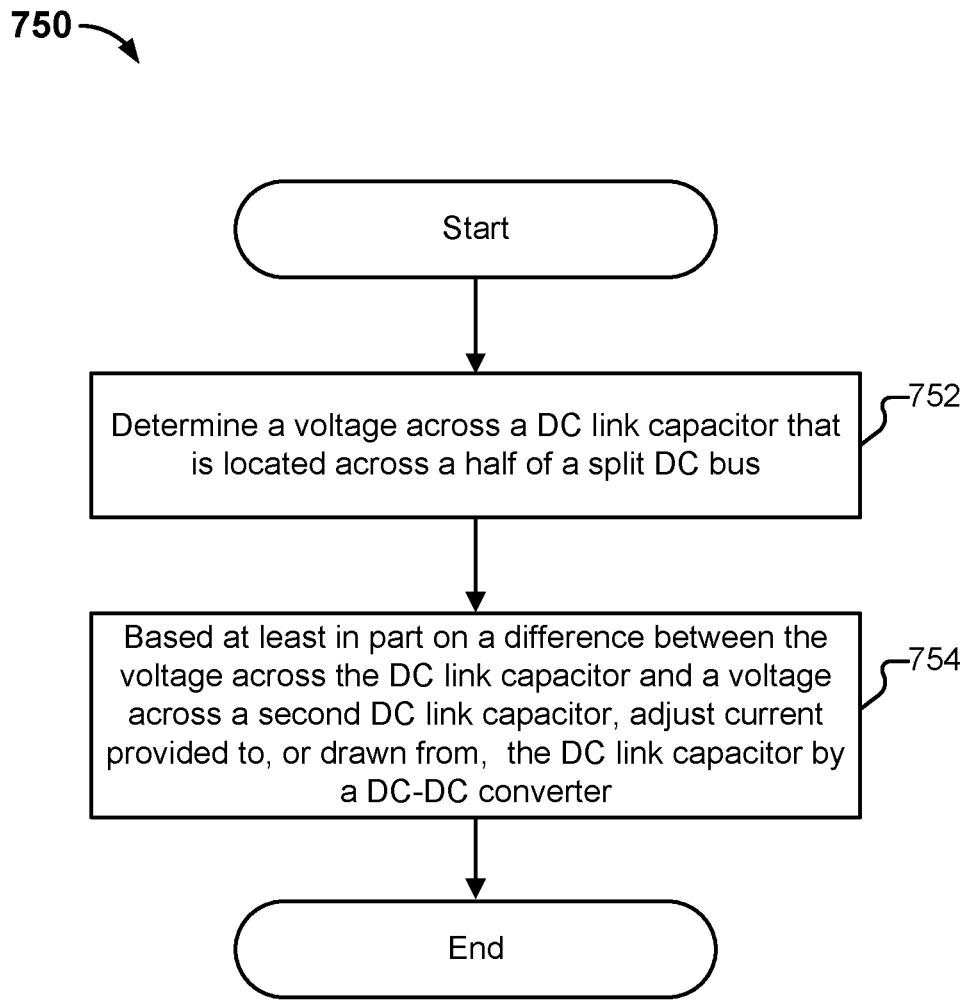
FIG. 7C illustrates an embodiment of a process for balancing DC link capacitors in a split DC bus architecture using DC-DC converters.

FIG. 7C illustrates an embodiment of a process for balancing DC link capacitors in a split DC bus architecture using DC-DC converters. In some embodiments, process 750 is executed by a controller such as DC-DC converter balancing controller 604. In some embodiments, process 700 is implemented using process 750. The process begins at 752, when a voltage across a DC link capacitor is determined. The DC link capacitor is included in a pair of DC link capacitors that are across a split DC bus. The DC link capacitor is located across half of the split DC bus. In some embodiments, the DC link capacitor is located across a neutral line and one of a positive side or a negative side of the DC bus. The DC link capacitor is also located across an output of a DC-DC converter.

At 754, based at least in part on a difference determined between the measured voltage across the DC link capacitor and a voltage measured across the other DC link capacitor, current provided to, or drawn from, the DC link capacitor by the DC-DC converter is adjusted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A split DC (Direct Current) bus inverter architecture, comprising:
   a positive DC bus;
   a negative DC bus;
   a neutral node;
   a first capacitor connected between the positive DC bus and the neutral node;
   a second capacitor connected between the negative DC bus and the neutral node;
   a balancing leg that is controlled to balance voltages of the first capacitor and the second capacitor; and
   a split phase output.

2. The split DC bus inverter architecture of claim 1, wherein balancing the voltages of the first capacitor and the second capacitor comprises controlling the balancing leg to redistribute charge between the first capacitor and the second capacitor.

3. The split DC bus inverter architecture of claim 2, wherein the balancing leg comprises a first switch, a second switch, and an inductor.

4. The split DC bus inverter architecture of claim 3, wherein the first switch is connected between the positive DC bus and a first node, the second switch is connected between the negative DC bus and the first node, and wherein the inductor is connected between the first node and the neutral node.

5. The split DC bus inverter architecture of claim 3, wherein the inductor modulates a change in current when opening at least one of the first switch or the second switch.

6. The split DC bus inverter architecture of claim 3, further comprising a controller, and wherein opening or closing of at least one of the first switch or the second switch is controlled by the controller.

7. The split DC bus inverter architecture of claim 6, wherein the controller controls opening or closing of at least one of the first switch or the second switch based at least in part on a difference determined between voltages of the first capacitor and the second capacitor.

8. The split DC bus inverter architecture of claim 1, wherein a first output and a second output of a series-connected string of optimizers are connected to the positive DC bus and the negative DC bus, respectively.

9. The split DC bus inverter architecture of claim 8, wherein each optimizer in the string of optimizers is coupled to a PV (photovoltaic) panel.

10. The split DC bus inverter architecture of claim 1, wherein the split phase output is coupled to a circuit breaker panel.

* * * * *